US008627916B2

(12) United States Patent
Shinde et al.

(10) Patent No.: US 8,627,916 B2
(45) Date of Patent: Jan. 14, 2014

(54) SADDLE RIDING TYPE VEHICLE (75) Inventors: Yasuo Shinde, Saitama (JP); Keiichiro Niizuma, Saitama (JP); Masato Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 13/166,556

(22) Filed: Jun. 22, 2011

(65) Prior Publication Data
US 2011/0315467 A1 Dec. 29, 2011

(30) Foreign Application Priority Data
Jun. 25, 2010 (JP) .................................. 2010-144481

(51) Int. Cl.
*B60K 23/04* (2006.01)

(52) U.S. Cl.
USPC ......... 180/335; 180/219; 74/500.5; 74/502.4; 74/502.6; 123/376; 123/399

(58) Field of Classification Search
USPC .......... 180/219, 315, 335, 336; 123/399, 376, 123/400; 74/500.5, 501.5, 502.4, 502.6
See application file for complete search history.

(56) References Cited

U.S. PATENT DOCUMENTS

| 6,907,954 B2 * | 6/2005 | Tanaka ........................... 180/335 |
| 7,549,495 B2 * | 6/2009 | Takahashi et al. ............. 180/219 |
| 2003/0217612 A1 * | 11/2003 | Tanaka ............................ 74/489 |
| 2007/0089923 A1 * | 4/2007 | Oohashi et al. ............... 180/229 |
| 2008/0236543 A1 | 10/2008 | Yoshizawa |
| 2012/0241241 A1 * | 9/2012 | Takamura et al. ............ 180/335 |

FOREIGN PATENT DOCUMENTS

| EP | 1 541 457 A1 | 6/2005 |
| JP | 2003-267284 A | 9/2003 |
| JP | 2009-184578 A | 8/2009 |

* cited by examiner

*Primary Examiner* — Ruth Ilan (74) *Attorney, Agent, or Firm* — Birch, Stewart, Kolasch & Birch, LLP (57) ABSTRACT

A saddle riding vehicle having an accelerator operator includes an accelerator operation amount detecting unit connected to a second end portion of an accelerator cable having a first end portion connected to the accelerator operator, the accelerator operation amount detecting unit is disposed at a location less susceptible to the effect from an external force and steering of the steering handlebar with a space to permit removal of screws and other parts that may be dropped during the assembly process. An accelerator operation amount detecting unit includes a rotatable member connected to an accelerator cable so as to be rotated according to displacement of the accelerator cable and a cover plate extending in a longitudinal direction to cover the rotatable member from an upward direction. The accelerator operation amount detecting unit is disposed near a head pipe.

20 Claims, 6 Drawing Sheets

SADDLE RIDING TYPE VEHICLE

CROSS-REFERENCE TO RELATED APPLICATIONS

The present application claims priority under 35 USC 119 to Japanese Patent Application No. 2010-144481 filed on Jun. 25, 2010 the entire contents of which are hereby incorporated by reference.

BACKGROUND OF THE INVENTION

1. Field of the Invention

The present invention relates to a saddle riding type vehicle including a bar-like steering handlebar removably and steerable supported on a head pipe that is disposed at a front end of a vehicle body frame and inclined upwardly toward the rear. An accelerator operator is disposed on the steering handlebar with an accelerator cable having a first end portion connected to the accelerator operator so as to be displaced accordingly as the accelerator operator is operated. An accelerator operational amount detecting unit is connected to a second end portion of the accelerator cable so as to detect an operational amount of the accelerator operator.

2. Description of Background Art

A technique that is referred to as "drive-by-wire" (DBW, also known as "throttle-by-wire") is known, wherein an operational amount of an accelerator operator disposed on a steering handlebar is detected and, according to the operational amount detected, an output of power unit is controlled. Japanese Patent Laid-Open No. 2003-267284 discloses a saddle riding type vehicle incorporating such a DBW system.

In the technique disclosed in Japanese Patent Laid-Open No. 2003-267284, a displacement amount of a throttle cable is configured to be displaced accordingly as a throttle grip disposed on a steering handlebar is operated and is detected by a throttle sensor disposed on a top bridge of a front fork. Thereafter, an output of an electric motor as a power unit is controlled according to an amount detected.

With the accelerator operation amount detecting unit structured to detect the operational amount of the accelerator operator via the accelerator cable, consideration is to be given to the steering of the steering handlebar. Restrictions are therefore imposed on a specific location at which to dispose the accelerator operation amount detecting unit. Meanwhile, there are a number of portions to be tightened existing upwardly of the head pipe that serves as a center of steering, including a cover, a meter, and the steering handlebar. A need therefore arises for consideration of the possible effects on the detecting unit from a screw or a bolt that may come loose and drop.

SUMMARY AND OBJECTS OF THE INVENTION

The present invention has been made in view of the foregoing situations and it is an object of an embodiment of the present invention to provide a saddle riding type vehicle having an accelerator operational amount detecting unit for detecting an operational amount of an accelerator operator via an accelerator cable disposed at a location less susceptible to an effect from the steering of a steering handlebar. The present invention takes into and consideration screws and other parts that may be dropped during, for example, assembly processes.

To achieve the foregoing object, according to an embodiment of the present invention a saddle riding type vehicle includes a bar-like steering handlebar removably and steerably supported on a head pipe that is disposed at a front end of a vehicle body frame and inclined upwardly toward a rear. An accelerator operator is disposed on the steering handlebar with an accelerator cable having a first end portion connected to the accelerator operator so as to be displaced according as the accelerator operator is operated. An accelerator operation amount detecting unit is connected to a second end portion of the accelerator cable so as to detect an operational amount of the accelerator operator. In the saddle riding type vehicle, the accelerator operation amount detecting unit includes a rotatable member connected to the second end portion of the accelerator cable so as to be rotated according to displacement of the accelerator cable and a cover plate extending in a direction of a rotation axis of the rotatable member to cover the rotatable member from an upward direction. The accelerator operation amount detecting unit is disposed near the head pipe.

According to an embodiment of the present invention, the cover plate is disposed in an inclined position so as to be disposed more downwardly toward an outside in a vehicle width direction.

According to an embodiment of the present invention, the accelerator operation amount detecting unit is offset on a first side in a crosswise direction relative to the head pipe in a front view.

According to an embodiment of the present invention, the accelerator operation amount detecting unit and the accelerator operator are offset on a first side in the crosswise direction relative to the head pipe in a front view; and the accelerator cable extending from the accelerator operator to a second side of the head pipe is routed to be curved around the head pipe and connected to the accelerator operation amount detecting unit.

According to an embodiment of the present invention, the saddle riding type vehicle further includes a front stay having a pair of left and right upstanding frame portions disposed forwardly of the head pipe so as to extend vertically along the head pipe and a front cover for covering the head pipe from a forward direction. In the saddle riding type vehicle, the front stay is fixed to the head pipe so as to support the front cover. One of the pair of right and left upstanding frame portions offset on a side of accelerator operation amount detecting unit in the crosswise direction relative to the head pipe has a recessed portion that allows at least the rotatable member of the accelerator operation amount detecting unit to be visible from the forward direction.

According to an embodiment of the present invention, the accelerator operation amount detecting unit is disposed between outer edges of the pair of right and left upstanding frame portions in a front view.

According to an embodiment of the present invention, the front stay is supported on the head pipe via a pair of supporting tubes that are fixedly attached to the head pipe at two places vertically spaced apart from each other and extend forwardly and the accelerator operation amount detecting unit is disposed between the pair of supporting tubes in a side view.

According to an embodiment of the present invention, the saddle riding type vehicle further includes a headlight supported on the front stay.

An accelerator grip 97 of an embodiment of the present invention corresponds to the accelerator operator of the present invention and a drum 102 of the embodiment of the present invention corresponds to the rotatable member of the present invention.

According to an embodiment of the present invention, the accelerator operation amount detecting unit including the rotatable member that is rotatable according to the displacement of the accelerator cable is disposed near the head pipe. The accelerator operation amount detecting unit is therefore less susceptible to effect from steering of the steering handlebar. In addition, the accelerator operation amount detecting unit has a cover plate that extends in the direction of the rotation axis of the rotatable member to cover the rotatable member from the upward direction. If a screw or a bolt is dropped during mounting of portions upward of the head pipe, the cover plate can receive the part dropped, so that a detecting portion of the accelerator operation amount detecting unit can be prevented from being affected.

According to an embodiment of the present invention, the cover plate is disposed in an inclined position so as to be disposed more downwardly toward the outside in the vehicle width direction. This allows a screw or a bolt that may fall from the upward direction to be dropped outward in the vehicle width direction, specifically, where there are a smaller number of attached members. The arrangement also helps make rainwater or other objects less likely to accumulate on the cover plate.

According to an embodiment of the present invention, the accelerator operation amount detecting unit is offset on a first side in the crosswise direction relative to the head pipe in a front view. Even with an external force acting from the forward direction, the accelerator operation amount detecting unit is less likely to be cramped with the head pipe. This further minimizes the effect from the forward external force on the accelerator operation amount detecting unit.

According to an embodiment of the present invention, the accelerator cable extending from the accelerator operator that is offset on a first side in the crosswise direction relative to the head pipe in a front view to a second side of the head pipe is routed to be curved around the head pipe and connected to the accelerator operation amount detecting unit that is offset on the first side in the crosswise direction relative to the head pipe in a front view. The accelerator operation amount detecting unit can therefore be disposed near the head pipe, while an adequate flexibility is maintained in the accelerator cable, so that effect from steering can be further reduced.

According to an embodiment of the present invention, the pair of left and right upstanding frame portions included in the front stay that is fixed to the head pipe so as to support the front cover is disposed forwardly of the head pipe so as to extend vertically along the head pipe. One of the pair of right and left upstanding flame portions offset on the side of the accelerator operation amount detecting unit in the crosswise direction relative to the head pipe has the recessed portion that allows at least the rotatable member of the accelerator operation amount detecting unit to be visible from the forward direction. If the upstanding frame portion is moved rearwardly by a forward external force, the recessed portion circumvents at least the rotatable member of the accelerator operation amount detecting unit, so that effect of the external force on the accelerator operation amount detecting unit can be even further minimized.

According to an embodiment of the present invention, the accelerator operation amount detecting unit is disposed between the outer edges of the two upstanding frame portions in a front view. As a result, external forces from sides are less likely to reach the accelerator operation amount detecting unit.

According to an embodiment of the present invention, the front stay is supported on the head pipe via the pair of supporting tubes that extend forwardly from the head pipe. The accelerator operation amount detecting unit is disposed, in a side view, so as to exist between the pair of supporting tubes. Effect of the external force on the accelerator operation amount detecting unit can therefore be even further minimized.

According to an embodiment of the present invention, the headlight is supported by the front stay, which eliminates the need for supporting members dedicated to the headlight, leading to a reduced number of parts used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not imitative of the present invention, and wherein.

DETAILED DESCRIPTION OF THE PREFERRED EMBODIMENTS

Figure 1:
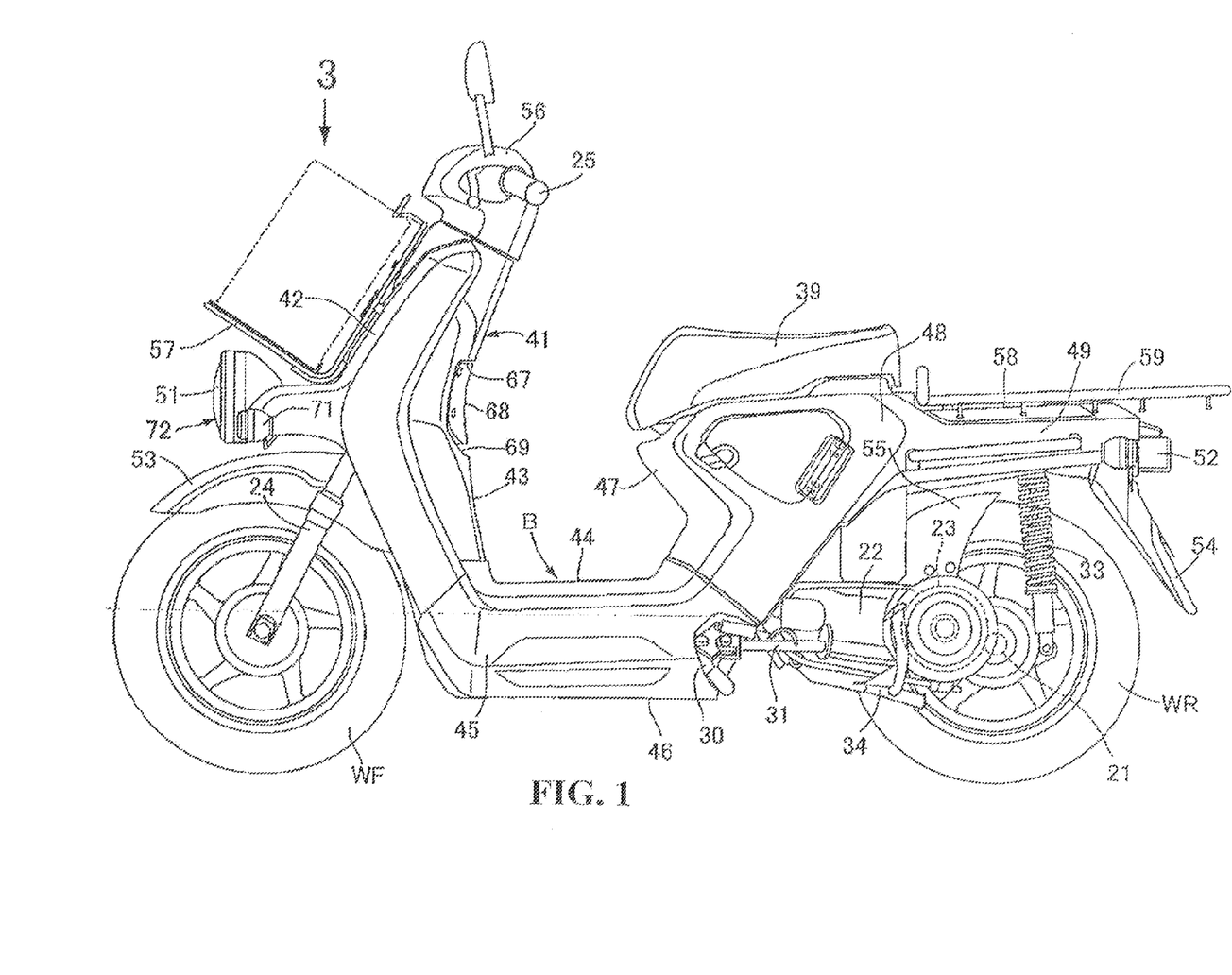
FIG. 1 is a side elevational view showing an electric drive motorcycle.

A specific embodiment to which the present invention is applied will be described below with reference to FIGS. 1 through 6. As illustrated in FIG. 1, the saddle riding type vehicle is a scooter type electric drive motorcycle having a low floor 44. The electric drive motorcycle is structured so that a rear wheel WR is rotatably driven by a rotatable drive power produced by an electric motor 23 that is built into a swing arm 22 having a rear portion journaling an axle 21 of the rear wheel WR.

Figure 2:
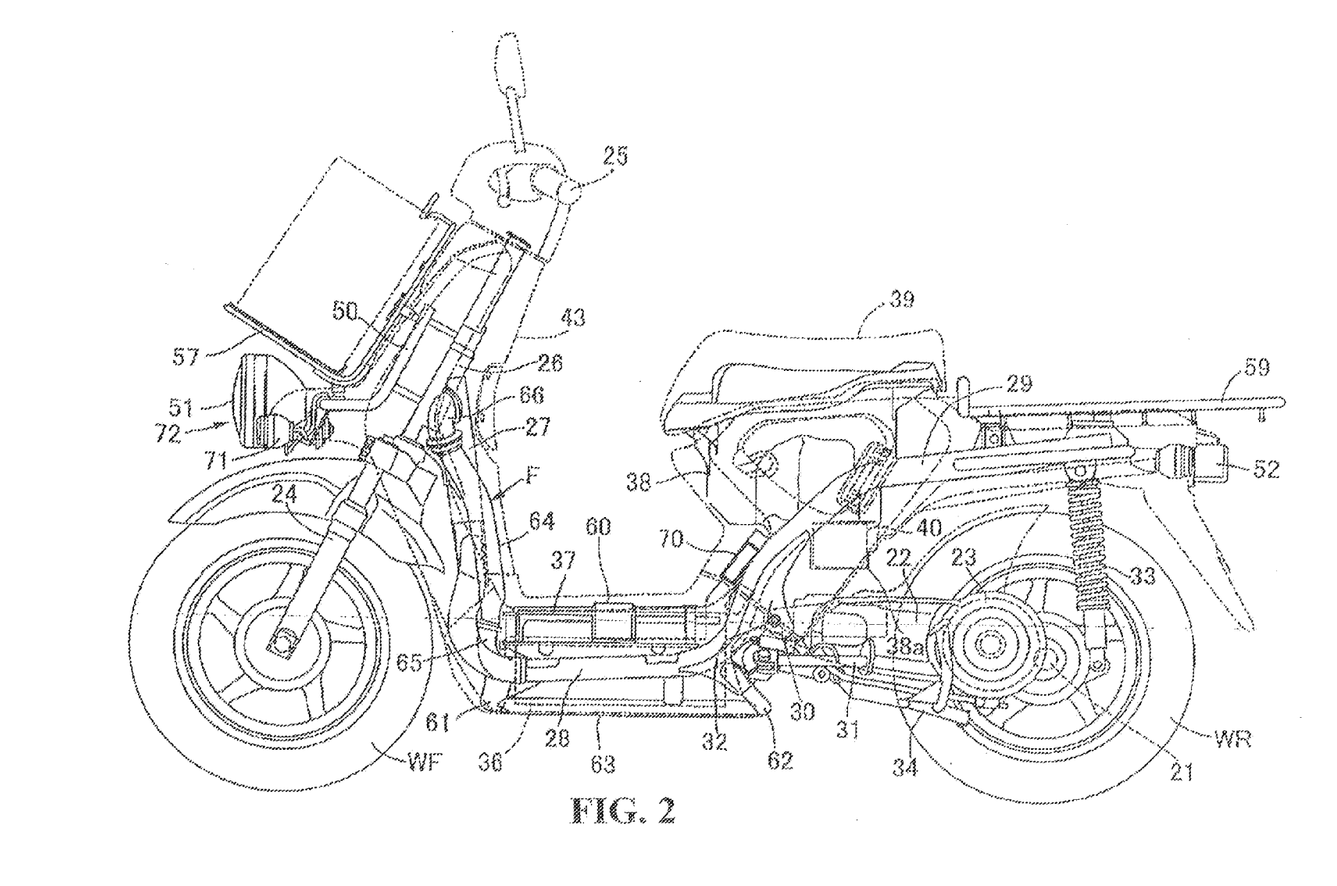
FIG. 2 is a side elevational view showing the electric drive motorcycle with vehicle body covers omitted.

Referring to FIG. 2, a vehicle body frame F of the electric drive motorcycle generally includes a head pipe 26, a down frame 27, a pair of left and right under frames and a pair of left and right rear frames 29 . . . . More specifically, the head pipe 26 is inclined upwardly toward the rear so as to support removably and steerably a front fork 24 that journals a front wheel WF and a bar-like steering handlebar 25 that is connected to an upper portion of the front fork 24. The down frame 27 extends downwardly toward the rear from the head pipe 26. The under frames 28 . . . are connected to a lower portion of the down frame 27 and extend rearwardly. The rear frames 29 . . . are integrally joined to rear ends of the under frames 28 . . . and extend upwardly toward the rear.

Pivot plates 30 . . . are disposed at front portions of the rear frames 29 . . . in the vehicle body frame F. A side stand 31 for holding a vehicle body B in a leftwardly inclined standing position is rotatably attached to the pivot plates 30 . . . . In addition, the swing arm 22 has a front portion removably and swingably supported on the pivot plates 30 . . . via a pivot 32. A rear shock absorber 33 is disposed between a rear portion of a left rear frame 29 of the two rear frames 29 . . . and a rear portion of the swing arm 22. A main stand 34 is rotatably attached to the front portion of the swing arm 22.

A battery case 37 is disposed between the two under frames 28 . . . so as to be supported thereby. The battery case 37 has a built-in high-voltage battery 36, for example, a 72-V battery for supplying the electric motor 23 with electric power. A storage box 38 disposed upwardly of the swing arm 22 in a side view is disposed between the two rear frames 29 . . . so as to be supported thereby. The storage box 38 is covered from an upward direction in an openable riding seat 39. In addition, a battery storage unit 38a is integrally formed on a lower portion of a rear side of the storage box 38 so as to protrude downwardly. The battery storage unit 38a stores a low-voltage battery 40 for supplying accessories including a headlight 51 and a tail light 52, with electric power of a low voltage, for example, 12 V.

The vehicle body frame F is covered in a vehicle body cover 41, formed of a synthetic resin, which constitutes the vehicle body 13 with the vehicle body frame F. The vehicle body cover 41 generally includes a front cover 42, a leg shield 43, the low floor 44, a pair of left and right floor side covers 45 an under cover 46, a seat lower front portion cover 47, a pair of left and right side covers 48 and a rear cover 49. More specifically, the front cover 42 covers the head pipe 26 from a forward direction. The leg shield 43 is joined to the front cover 42 so as to cover from the forward direction leg portions of an occupant sitting on the riding seat 39. The low floor 44 is joined to a lower portion of the leg shield 43 so as to allow the occupant sitting on the riding seat 39 to rest his or her feet and covers the battery case 37 from an upward direction. The floor side covers 45 . . . droop from both sides of the low floor 44 so as to cover from both sides the under frames 28 . . . . The under cover 46 connects lower edges of the floor side covers 45 . . . . The seat lower front portion cover 47 upstands from a rear end of the low floor 44 so as to cover from the forward direction an area downward of the riding seat 39. The side covers 48 . . . are joined to both sides of the seat lower front portion cover 47 so as to cover from both sides areas downward of the riding seat 39. The rear cover 49 covers the rear wheel WR from an upward direction to be jointed to the two side covers 48 . . . . The battery case 37 is covered by the vehicle body cover 41 with the low floor 44, the floor side covers 45 . . . , the under cover 46, the seat lower front portion cover 47, and the side covers 48 . . . .

The headlight 51 is disposed at a front end of the front cover 42 so as to be supported by a front stay 50 fixed to the head pipe 26. The tail light 52 is mounted on the rear frames 29 . . . . A front fender 53 is disposed downwardly of the front cover 42. The front fender 53 is mounted on the front fork 24 so as to cover the front wheel WF from the upward direction. A rear fender 54 for covering the rear wheel WR from an obliquely upward direction from the rear is disposed in a connected row arrangement with the rear cover 49. In addition, a fender 55 for covering the rear wheel WR from an obliquely upward direction from the front is mounted at a front portion of the swing arm 22. Additionally, a central portion of the steering handlebar 25 is covered in a handlebar cover 56. A front carrier 57 disposed forwardly of the front cover 42 is supported by the front stay 50. A cargo deck 58 is disposed rearwardly of the riding seat 39 and on an upper portion of the rear cover 49. A carrier 59 disposed upwardly of the cargo deck 58 is removably mounted on the rear frames 29 . . . .

A cross member 60 is disposed across the two under frames 28 . . . . The cross member 60 straddles a central portion in a longitudinal direction of the battery case 37. The low floor 44 is supported by the cross member 60. In addition, a front portion protecting member 61 for protecting a front side lower portion of the battery case 37 from the forward direction is disposed across front portions of the two under frames 28 . . . so that a central portion thereof is connected to a lower end of the down frame 27. A rear portion protecting member 62 for protecting a rear side lower portion of the battery case 37 from a rearward direction is disposed across rear portions of the under frames 28 . . . . A plurality of lower portion protecting members 63 . . . extending longitudinally is disposed between the front and rear portion protecting members 61, 62 so as to protect the battery case 37 from a downward direction.

A pair of left and right cooling air introducing ducts 64 . . . includes downstream end portions connected to a front portion of the battery case 37 via connecting pipes 65 . . . . The two cooling air introducing ducts 64 . . . are disposed so as to sandwich the down frame 27 from both sides inside the leg shield 43 and extend along the down frame 27. In addition, the leg shield 43 has a recessed portion 67 formed therein at a position corresponding to a connection of the down frame 27 to the head pipe 26. A lid 68 for covering an upper portion of the recessed portion 67 is attached to the leg shield 43. An air intake port 69 is formed between a lower edge of the lid 68 and the recessed portion 67. The two cooling air introducing ducts 64 . . . have upstream ends connected to the leg shield 43 via connecting pipes 66 . . . so as to communicate with the air intake port 69.

A cooling fan 70 is mounted on a rear portion upper surface of the battery case 37. Through operation of the cooling fan 70, air drawn in through the air intake port 69 is introduced into the battery case 37 by way of the connecting pipes 66 . . . , the cooling air introducing ducts 64 . . . , and the connecting pipes 65 . . . , to thereby cool the high-voltage battery 36 inside the battery case 37. The air is then discharged from the battery case 37 to an outside by the cooling fan 70.

Figure 3:
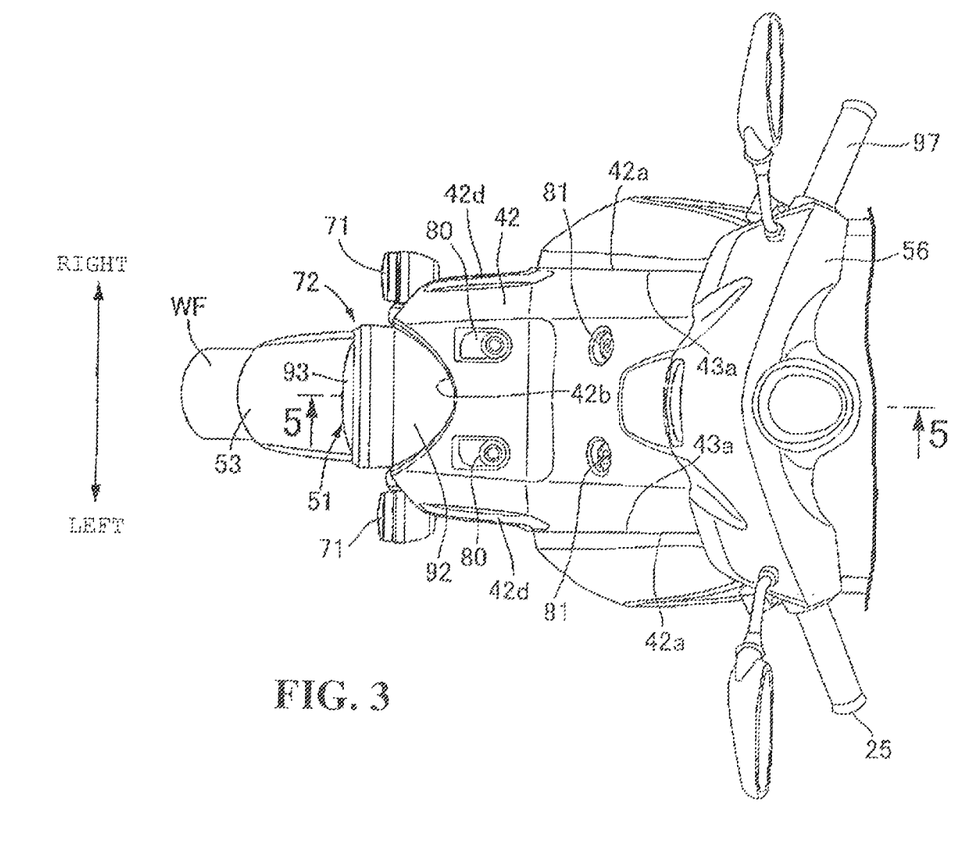
FIG. 3 is a view on arrow 3 of FIG. 1 with a front carrier removed.
Figure 4:
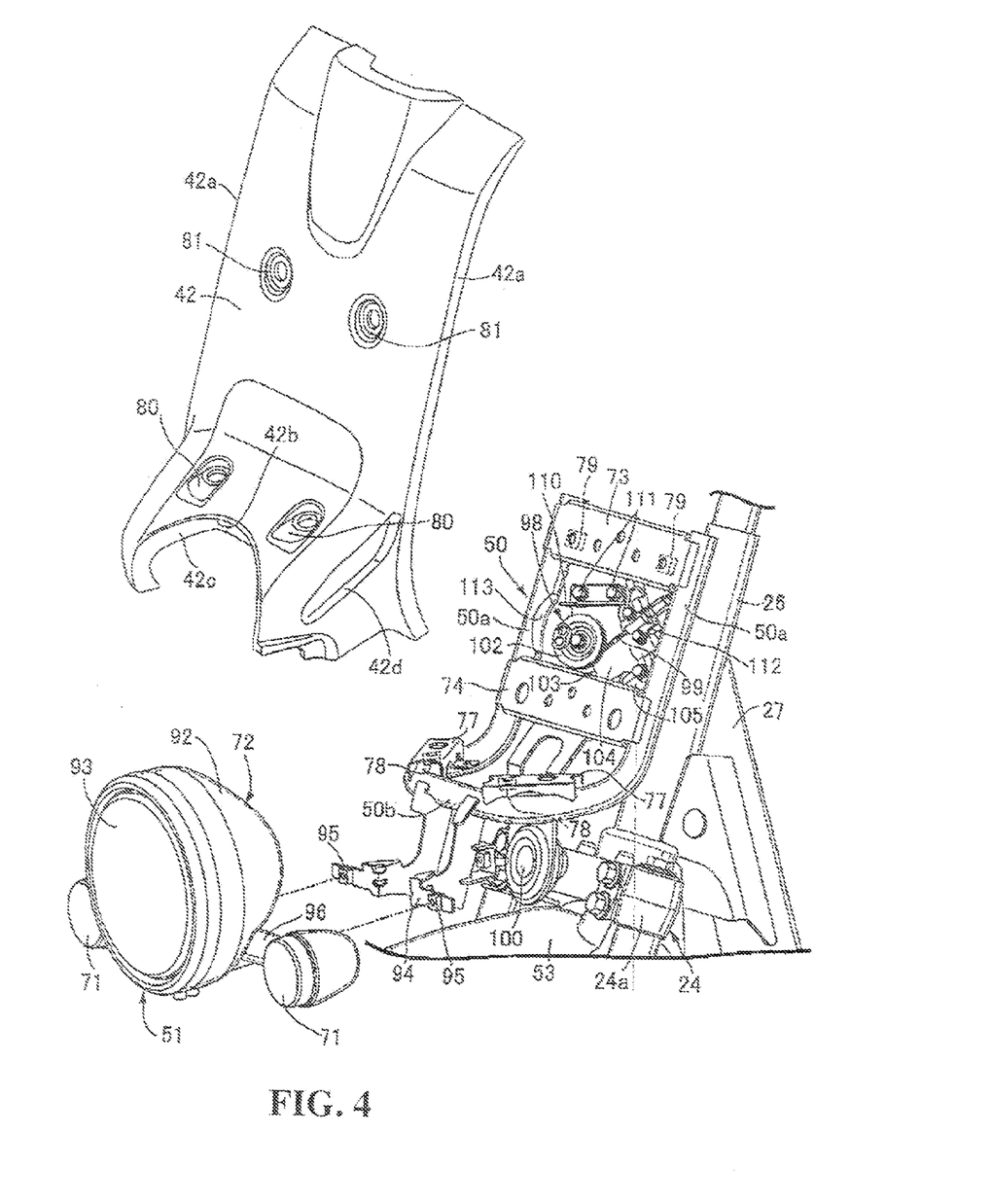
FIG. 4 is an exploded perspective view showing a front portion of the electric drive motorcycle with the front carrier removed.
Figure 5:
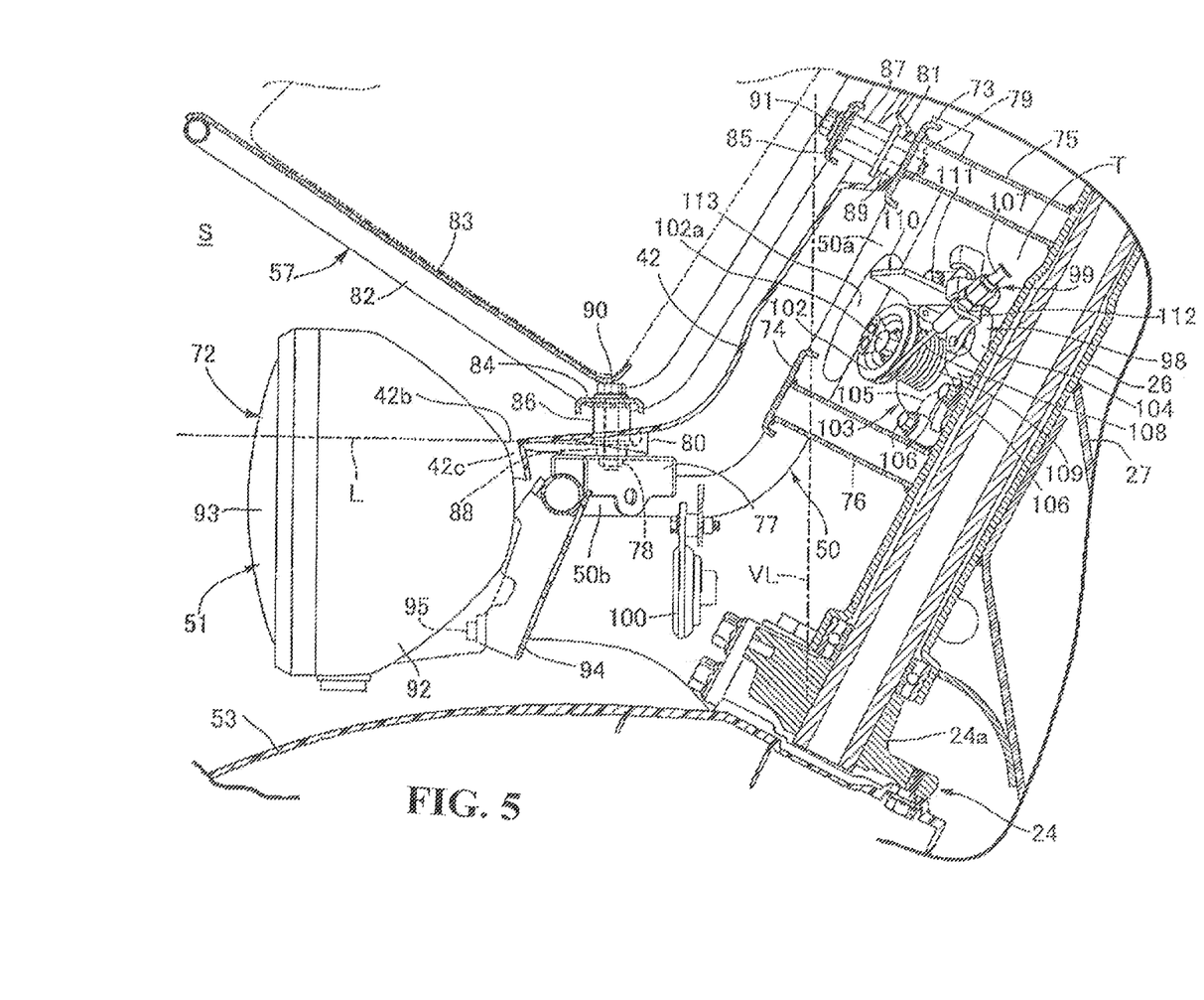
FIG. 5 is a cross-sectional view taken along line 5-5 of FIG. 3 with the front carrier mounted.

Referring to FIGS. 3 to 5, the headlight 51 and a pair of turn signals 71, 71, disposed on either side of the headlight 51 are integrated as a unit into a lighting apparatus unit 72. The front stay 50 that supports the lighting apparatus unit 72 generally includes a pair of left and right upstanding frame portions 50a, 50a and a base portion 50b. More specifically, the upstanding frame portions 50a, 50a are spaced apart from each other in a crosswise direction and disposed forwardly of the head pipe 26 so as to extend along the head pipe 26. The base portion 50b extends forwardly from lower ends of the upstanding frame portions 50a . . . . The base portion 50b is formed substantially into a U-shape opening rearwardly. The base portion 50b and the upstanding frame portions 50a . . . are integrally formed by bending a metal bar.

A pair of connecting plates 73, 74 that are spaced apart from each other vertically is disposed across the two upstanding frame portions 50a . . . . Meanwhile, supporting tubes 75, 76 extending forwardly are fixedly attached to a front portion of the head pipe 26 at two places vertically spaced apart from each other. A first supporting tube 75 has a front end fixedly attached to the connecting plate 73 at a crosswise central portion thereof. A second supporting tube 76 has a front end fixedly attached to the connecting plate 74 at a crosswise central portion thereof. More specifically, the front stay 50 is fixed to the head pipe 26 via the supporting tubes 75, 76.

The front cover 42 is formed to cover the upstanding frame portions 50*a* . . . of the front stay 50 from the forward direction and the base portion 50*b* of the front stay 50 from the upward and sideways directions. The front cover 42 is supported on the base portion 50*b* in the front stay 50 and on the connecting plate 73 that connects the upper portions of the upstanding frame portions 50*a* . . . so as to face a front portion of the headlight 51 forwardly.

Supporting bases 77, 77 are disposed on both crosswise sides of a front end portion of the base portion 50*b*. Weld nuts 78 . . . are welded to the supporting bases 77 . . . . Weld nuts 79 . . . are also welded to the connecting plate 73 at two places spaced apart from each other in the crosswise direction. In addition, the front cover 42 has first counterbored portions 80 . . . recessed toward the side of the supporting bases 77 . . . at portions corresponding to the supporting bases 77 . . . . The front cover 42 further has second counterbored portions 81 . . . recessed toward the side of the connecting plate 73 at portions corresponding to the weld nuts 79 . . . of the connecting plate 73.

The front carrier 57 generally includes a frame portion 82, a flat sheet-like base plate 83, a first supporting plate 84, and a second supporting plate 85. More specifically, the frame portion 82 is formed by bending a metal round bar substantially into an L-shape in a side view. The base plate 83 is fixedly attached to a lower portion of the frame portion 82. The first supporting plate 84 has both ends connected to the frame portion 82 at portions corresponding to the first counterbored portions 80 . . . . The second supporting plate 85 has both ends connected to the frame portion 82 at portions corresponding to the second counterbored portions 81 . . . . Cylindrical collars 86 . . . have lower end portions inserted into the first counterbored portions 80 . . . with upper ends fixedly attached to the first supporting plate 84. Cylindrical collars 87 . . . have lower end portions inserted into the second counterbored portions 81 . . . with upper ends fixedly attached to the second supporting plate 85.

The first counterbored portions 80 . . . are attached with flanged collars 88 . . . that abut on the supporting bases 77 . . . . The second counterbored portions 81 . . . are attached with flanged collars 89 . . . that abut on the connecting plate 73. The front carrier 57 is fastened to the front stay 50 jointly with the front cover 42 as follows: more specifically, with the collars 86 . . . , 87 . . . held in abutment on the flanged collars 88 . . . , 89 . . . , bolts 90 . . . , 91 . . . are inserted into the collars 86 . . . , 87 . . . and the flanged collars 88 . . . , 89 . . . are threadedly tightened on the weld nuts 78 . . . , 79 . . . . Accordingly, the front carrier 57 mounted on the front stay 50 is disposed forwardly of the front cover 42 in a position of substantially forming an L-shape in a side view, in which the base plate 83 is inclined upwardly toward the front.

The headlight 51 generally includes a housing 92 and a lens 93. More specifically, the housing 92 is formed like a bombshell in a side view. The lens 93 is circularly formed as viewed from the front and mounted at a front end of the housing 92. A headlight supporting portion 94 is disposed in a connected row arrangement on the base portion 50*b* of the front stay 50. The headlight supporting portion 94 extends downwardly from a front end of the base portion 50*b*. The housing 92 in the headlight 51 has a lower portion attached to a lower portion of the headlight supporting portion 94. More specifically, the headlight supporting portion 94 has weld nuts 95, 95 welded to the lower portion thereof at two places spaced apart from each other. The lower portion of the housing 92 of the headlight 51 and arm portions 96 . . . for integrating the turn signals 71 . . . on both sides of the headlight 51 into the lighting apparatus unit 72 are attached to the lower portion of the headlight supporting portion 94 with bolts (not shown) threadedly tightened to the weld nuts 95 . . . .

It should be noted here that the front carrier 57 formed substantially into an L-shape in a side view and disposed forwardly of the front cover 42 includes the base plate 83 that is inclined upwardly toward the front. The headlight 51 has an upper portion disposed in a space S that is formed between an extension line L extending forwardly from a front portion of the front cover 42 and the base plate 83 and that expands forwardly.

The foregoing arrangement allows a round, highly universal headlight 51 having a relatively large diameter to be applied. Even if the front carrier 57 is designed to take up a large space, a highly universal headlight 51 capable of emitting a sufficient intensity of light can be employed at a low cost. The shapes of the headlight may also be varied, so that attractive impression may be given with a round, large-diameter design.

The front fork 24 that journals the front wheel WF on the lower end portion includes a bridge portion 24*a* disposed upwardly of the front wheel WF. The front fender 53 disposed downwardly of the front cover 42 to cover the front wheel WF from the upward direction is supported on the bridge portion 24*a*.

A part of the front portion of the front cover 42 covering the upper portion of the headlight 51 includes a front end 42*b* that is curved to protrude rearwardly along a rear surface of the headlight 51 in a plan view. A larger area of the upper portion of the headlight 51 can thereby be exposed, while a mounting portion of the headlight 51 relative to the front stay 50 can be inhibited from being exposed. Additionally, the front cover 42 further includes a drooping portion 42*c* and recessed portions 42*d* . . . . The drooping portion 42*c* droops downwardly from the front end 42*b* and is integrated with the front cover 42 so as to enhance rigidity of the front end 42*b*. The recessed portions 42*d* . . . are disposed on both sides at the front portion of the front cover 42, inwardly recessed for increased rigidity of the front portion of the front cover 42.

The leg shield 43 extends forwardly of the head pipe 26 so as to cover the head pipe 26 from sides. The leg shield 43 has both side edges 43*a*. 43*a* connected to both side edges 42*a*, 42*a* of the front cover 42 on both sides of the upstanding frame portions 50*a* . . . of the front stay 50. These arrangements achieve a reduction in size of the front cover 42.

An accelerator grip 97 as an accelerator operator for adjusting an output of the electric motor 23 as a drive power source that produces a drive power for driving the rear wheel WR is rotatably operably disposed on the right end portion of the steering handlebar 25. An accelerator cable 99 has a first end portion connected to the accelerator grip 97 so as to be displaced according to an operation of the accelerator grip 97. The accelerator cable 99 has a second end portion connected to an accelerator operation amount detecting unit 98 for detecting an operation amount of the accelerator grip 97. In addition, a horn 100 is supported on the lower side of the base portion 50*b* in the front stay 50.

Figure 6:
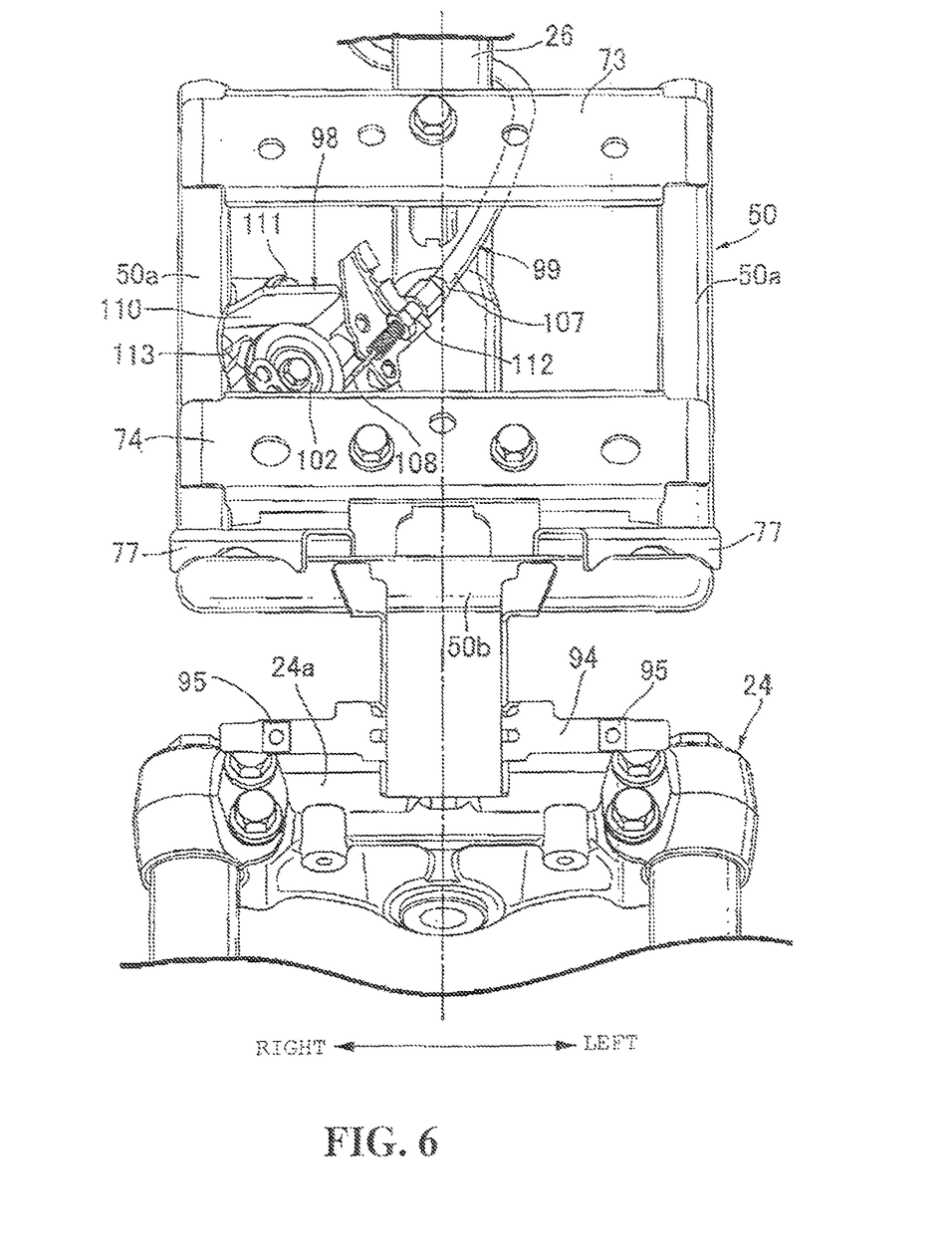
FIG. 6 is a view on arrow 6 of FIG. 5 with a front cover, the front carrier, and a headlight removed.

Referring also to FIG. 6, the accelerator operation amount detecting unit 98 generally includes a drum 102 and a sensor 103. More specifically, the drum 102 as a rotatable member is connected to the second end portion of the accelerator cable 99 so as to be rotated according to the displacement of the accelerator cable 99 having the first end portion connected to the accelerator grip 97. The sensor 103 detects an amount of rotation of the drum 102, more specifically, a rotatable operation amount of the accelerator grip 97. A sensor case 104 for the sensor 103 is fastened to a stay 105 fixedly attached to the head pipe 26 disposed in a position inclined upwardly toward the rear at the front end of the vehicle body frame F by using a pair of bolts 106, 106.

The sensor case 104 integrates a cable supporting portion 112. The accelerator cable 99 is a push-pull cable having an inner cable 108 movably passed through an outer cable 107. The outer cable 107 is supported by the cable supporting portion 112 at the second end portion of the accelerator cable 99.

The drum 102 is disposed forwardly of the sensor case 104 and rotatably supported by the sensor case 104. The inner cable 108 protruding from the outer cable 107 is wound around an outer periphery of the drum 102 and connected at the second end portion of the accelerator cable 99. Further, a return spring 109 is hooked between the drum 102 and the sensor case 104.

A cover plate 110 extending in a direction of a rotation axis of the drum 102 to cover the drum 102 from an upward direction is fastened at an upper portion of the sensor case 104 with a pair of bolts 111, 111. The cover plate 110 is inclined so as to be disposed more downwardly toward an outside in a vehicle width direction. The cover plate 110 has a front end disposed forwardly of a central portion front end 102a of the drum 102.

The accelerator operation amount detecting unit 98 as described above is disposed near the head pipe 26 at the front end of the vehicle body frame F, and, in a side view, rearwardly of a front end of a lower end portion of the head pipe 26. More specifically, referring to FIG. 5, the accelerator operation amount detecting unit 98 is disposed rearwardly of a vertical line VL that passes through the front end of the lower end portion of the head pipe 26. Moreover, the accelerator operation amount detecting unit 98 is disposed, in a front view, on one side in the crosswise direction of the head pipe 26; or in the embodiment of the present invention, the accelerator operation amount detecting unit 98, as well as the accelerator grip 97, is offset rightward relative to the head pipe 26 (leftward as viewed from the front).

The accelerator cable 99 extending from the accelerator grip 97 to the left of the head pipe 26 is routed to be curved around the head pipe 26 and connected to the drum 102 of the accelerator operation amount detecting unit 98.

The front stay 50 that is fixed to the head pipe 26 so as to support the front cover 42 for covering the head pipe 26 from the forward direction includes the pair of left and right upstanding frame portions 50a . . . that are disposed forwardly of the head pipe 26 so as to extend vertically along the head pipe 26. The accelerator operation amount detecting unit 98 is disposed, in a front view, between outer edges of the pair of right and left upstanding frame portions 50a . . . and, in a side view, between the upstanding frame portions 50a . . . of the front stay 50 and the head pipe 26. In addition, the front stay 50 is supported by the head pipe 26 via the supporting tubes 75, 76 that are fixedly attached to the head pipe 26 at two places vertically spaced apart from each other and extend forwardly. The accelerator operation amount detecting unit 98 is disposed, in a side view, in a space T between the pair of supporting tubes 75, 76.

One of the pair of right and left upstanding frame portions 50a of the front stay 50, offset on the side of the accelerator operation amount detecting unit 98 relative to the head pipe 26 has a recessed portion 113 that allows at least the drum 102 of the accelerator operation amount detecting unit 98 to be visible from the forward direction.

The effects of the embodiment of the present invention will be described below. The front stay 50 including the upstanding frame portions 50a . . . disposed forwardly of the head pipe 26 that removably and steerably supports the steering handlebar 25 and the front fork 24, so as to extend along the head pipe 26 and the base portion 50b extending forwardly from the lower ends of the upstanding frame portions 50a . . . is fixed on the head pipe 26 forwardly thereof. The front cover 42 for covering the upstanding frame portions 50a . . . from the forward direction and the base portion 50h from the upward and sideways directions is supported on the front stay 50 so as to face forwardly the front portion of the headlight 51 supported at the front portion of the base portion 50b.

Exposure of the mounting portion of the headlight 51 relative to the front stay 50 can therefore be minimized, so that the number of surface treatment processes for protection against rainwater can be reduced. In addition, the front cover 42 is open downwardly and can be mounted from the upward direction after the headlight 51 has been mounted on the front stay 50, which achieves assemblability. During servicing, the mounting portion of the headlight 51 relative to the front stay 50 can be accessed from below the front cover 42 without removing the front cover 42, which also achieves maintainability.

The front wheel WE journaled at the lower end portion of the front fork 24 is covered from the upward direction in the front lender 53 disposed downwardly of the front cover 42. Any object thrown up by the front wheel WE, e.g. mud, is therefore less easy to get into the front cover 42 even if the front cover 42 is open downwardly.

The headlight 51 and the pair of turn signals 71 . . . disposed on either side of the headlight 51 are integrated as a unit into the lighting apparatus unit 72, which enhances workability of mounting the headlight 51 and the turn signals 71 . . . .

The headlight supporting portion 94, which extends downwardly from the front end of the base portion 50b of the front stay 50, is disposed in a connected row arrangement on the base portion 50b. The headlight 51 has the lower portion attached to the lower portion of the headlight supporting portion 94. An even easier access from the downward direction to the mounting portion of the headlight 51 relative to the front stay 50 can therefore be gained, which further enhances maintainability.

The accelerator operation amount detecting unit 98 that detects the operation amount of the accelerator grip 97 for adjusting the output of the electric motor 23 which produces a drive power for driving the rear wheel WR is disposed, in a side view, between the upstanding frame portions 50a . . . of the front stay 50 and the head pipe 26. The accelerator operation amount detecting unit 98 can therefore be protected from the front and rear. In addition, the horn 100 is supported on the lower side of the base portion 50b in the front stay 50. In the same manner as with the mounting portion of the headlight 51 relative to the front stay 50, the horn 100 can be easily mounted and serviced.

In addition, the accelerator operation amount detecting unit 98, including the drum 102 that is connected to the second end portion of the accelerator cable 99 so as to be rotated according to displacement of the accelerator cable 99 having the first end portion connected to the accelerator grip 97, is disposed near the head pipe 26. The accelerator operation amount detecting unit 98 is therefore less susceptible to effect from steering of the steering handlebar 25.

The accelerator operation amount detecting unit 98 further includes the cover plate 110 that extends in the direction of the rotation axis of the drum 102 to cover the drum 102 from the upward direction. Should a screw or a bolt be dropped during mounting of portions upward of the head pipe 26, the cover plate 110 can receive the part dropped, so that a detecting portion of the accelerator operation amount detecting unit 98 can be prevented from being affected. In addition, the cover plate 110 is inclined so as to be disposed more downwardly toward an outside in the vehicle width direction. This allows a screw or a bolt that may fall from the upward direction to be dropped outwardly in the vehicle width direction, more specifically, where there are a smaller number of attached members. The arrangement also helps make rainwater or other object less likely to accumulate on the cover plate 110.

The accelerator operation amount detecting unit 98 is disposed, in a side view, rearwardly of the front end of the lower end portion of the head pipe 26. This makes an external force from the forward direction less likely to reach the accelerator operation amount detecting unit 98 and, in particular, the drum 102, which enhances the degree of freedom in design.

The accelerator operation amount detecting unit 98 is offset on one side in the crosswise direction relative to the head pipe 26 in a front view. Even with an external force acting from the forward direction, the accelerator operation amount detecting unit 98 is less likely to be cramped with the head pipe 26. This further minimizes the effect from the forward external force on the accelerator operation amount detecting unit 98.

In addition, the accelerator operation amount detecting unit 98 and the accelerator grip 97 are offset on one side in the crosswise direction relative to the head pipe 26 in a front view. The accelerator cable 99 extending from the accelerator grip 97 to the other crosswise side of the head pipe 26 is routed to be curved around the head pipe 26 and connected to the accelerator operation amount detecting unit 98. The accelerator operation amount detecting unit 98 can therefore be disposed near the head pipe 26, while an adequate flexibility is maintained in the accelerator cable 99, so that the effect from steering can be further reduced.

The front stay 50 that is fixed to the head pipe 26 so as to support the front cover 42 covering the head pipe 26 from the forward direction includes the pair of left and right upstanding frame portions 50*a* . . . disposed forwardly of the head pipe 26 so as to extend vertically along the head pipe 26. One of the pair of right and left upstanding frame portions 50*a* offset on the side of the accelerator operation amount detecting unit 98 in the crosswise direction relative to the head pipe 26 has the recessed portion 113 that allows at least the drum 102 of the accelerator operation amount detecting unit 98 to be visible from the forward direction. If the upstanding frame portion 50*a* is moved rearwardly by a forward external force, the recessed portion 113 circumvents at least the drum 102 of the accelerator operation amount detecting unit 98, so that effect of the external force on the accelerator operation amount detecting unit 98 can be even further minimized.

In addition, the accelerator operation amount detecting unit 98 is disposed between the outer edges of the two upstanding frame portions 50*a* . . . in a front view. As a result, external forces from sides are less likely to reach the accelerator operation amount detecting unit 98.

In addition, the front stay 50 is supported on the head pipe 26 via the pair of supporting tubes 75, 76 that are fixedly attached to the head pipe 26 at two places vertically spaced apart from each other and that extend forwardly. The accelerator operation amount detecting unit 98 is disposed, in a side view, in the space T between the pair of supporting tubes 75, 76. The effect of the external force on the accelerator operation amount detecting unit 98 can therefore be even further minimized.

The headlight 51 is supported by the front stay 50, which eliminates the need for supporting members dedicated to the headlight 51, leading to a reduced number of pans used.

(It should be understood that the present invention is not limited to the disclosed embodiment, but also encompasses various changes falling within the spirit and scope of the appended claims.

The present invention has been heretofore described with particular reference to the embodiment in which the present invention is applied to an electric drive motorcycle. Nonetheless, the present invention may also be widely applied, covering from an electric drive three-wheeled vehicle to a motorcycle or a three-wheeled vehicle of a saddle riding type having an internal combustion engine as a drive power source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle riding vehicle comprising:
   a bar-like steering handlebar removably and steerably supported on a head pipe that is disposed at a front end of a vehicle body frame and inclined upwardly towards a rear;
   an accelerator operator disposed on the steering handlebar;
   an accelerator cable having a first end portion connected to the accelerator operator so as to be displaced according as the accelerator operator is operated;
   an accelerator operation amount detecting unit connected to a second end portion of the accelerator cable for detecting an operation amount of the accelerator operator;
   wherein:
      the accelerator operation amount detecting unit includes a rotatable member connected to the second end portion of the accelerator cable for rotation according to displacement of the accelerator cable and a cover plate extending in a direction of a rotation axis of the rotatable member to cover the rotatable member from an upward direction; and
      the accelerator operation amount detecting unit is disposed near and in front of the head pipe; and
   a front stay having a pair of left and right upstanding frame portions disposed forwardly of the head pipe and extending vertically along the head pipe, wherein the accelerator operation amount detecting unit is offset toward one of the pair of right and left upstanding frame portions, and the one of the pair of right and left upstanding frame portions has a recessed portion that allows the accelerator operation amount detecting unit to be visible from a forward direction.

2. The saddle riding vehicle according to claim 1, wherein the cover plate is disposed in an inclined position and is disposed more downwardly toward an outside in a vehicle width direction.

3. The saddle riding vehicle according to claim 2, wherein the accelerator operation amount detecting unit is offset on a first side in a crosswise direction relative to the head pipe in a front view.

4. The saddle riding vehicle according to claim 1, wherein the accelerator operation amount detecting unit is offset on a first side in a crosswise direction relative to the head pipe in a front view.

5. The saddle riding vehicle according to claim 4, wherein:
   the accelerator operation amount detecting unit and the accelerator operator are offset on the first side in the crosswise direction relative to the head pipe in the front view; and the accelerator cable extending from the accelerator operator to a second side of the head pipe is routed to be curved around the head pipe and connected to the accelerator operation amount detecting unit.

6. The saddle riding vehicle according to claim 5, further comprising:
a front cover for covering the head pipe from the forward direction;
wherein:
the front stay is fixed to the head pipe so as to support the front cover; and
the recessed portion of the one of the pair of right and left upstanding frame portions allows at least the rotatable member of the accelerator operation amount detecting unit to be visible from the forward direction.

7. A saddle riding vehicle comprising:
a bar-like steering handlebar removably and steerably supported on a head pipe that is disposed at a front end of a vehicle body frame and inclined upwardly towards a rear;
an accelerator operator disposed on the steering handlebar;
an accelerator cable having a first end portion connected to the accelerator operator so as to be displaced according as the accelerator operator is operated;
an accelerator operation amount detecting unit connected to a second end portion of the accelerator cable for detecting an operation amount of the accelerator operator;
wherein:
the accelerator operation amount detecting unit includes a rotatable member connected to the second end portion of the accelerator cable for rotation according to displacement of the accelerator cable and a cover plate extending in a direction of a rotation axis of the rotatable member to cover the rotatable member from an upward direction; and
the accelerator operation amount detecting unit is disposed near the head pipe:
the accelerator operation amount detecting unit is offset on a first side in a crosswise direction relative to the head pipe in a front view,
a front stay having a pair of left and right upstanding frame portions disposed forwardly of the head pipe and extending vertically along the head pipe; and
a front cover for covering the head pipe from a forward direction;
wherein:
the front stay is fixed to the head pipe so as to support the front cover; and
one of the pair of right and left upstanding frame portions offset on a side of accelerator operation amount detecting unit in the crosswise direction relative to the head pipe has a recessed portion that allows at least the rotatable member of the accelerator operation amount detecting unit to be visible from the forward direction.

8. The saddle riding vehicle according to claim 7, wherein the accelerator operation amount detecting unit is disposed between outer edges of the pair of right and left upstanding frame portions in a front view.

9. The saddle riding vehicle according to claim 8, wherein:
the front stay is supported on the head pipe via a pair of supporting tubes that are fixedly attached to the head pipe at two places vertically spaced apart from each other and extend forwardly; and
the accelerator operation amount detecting unit is disposed between the pair of supporting tubes in a side view.

10. The saddle riding vehicle according to claim 8, further comprising:
a headlight supported on the front stay.

11. The saddle riding vehicle according to claim 7, wherein:
the front stay is supported on the head pipe via a pair of supporting tubes that are fixedly attached to the head pipe at two places vertically spaced apart from each other and extend forwardly; and
the accelerator operation amount detecting unit is disposed between the pair of supporting tubes in a side view.

12. The saddle riding vehicle according to claim 11, further comprising:
a headlight supported on the front stay.

13. The saddle riding vehicle according to claim 7, further comprising:
a headlight supported on the front stay.

14. An accelerator operator of a saddle riding vehicle comprising:
an accelerator cable having a first end portion connected to the accelerator operator for displacement accordingly as the accelerator operator is operated;
an accelerator operation amount detecting unit connected to a second end portion of the accelerator cable for detecting an operation amount of the accelerator operator;
said accelerator operation amount detecting unit including:
a rotatable member connected to the second end portion of the accelerator cable for rotation according to displacement of the accelerator cable, and
a cover plate extending in a direction of a rotation axis of the rotatable member to cover the rotatable member from an upward direction,
wherein the accelerator operation amount detecting unit is disposed near and in front of a head pipe of the saddle riding vehicle; and
a front stay having a pair of left and right upstanding frame portions disposed forwardly of the head pipe and extending vertically along the head pipe, wherein the accelerator operation amount detecting unit is offset toward one of the pair of right and left upstanding frame portions., and the one of the pair of right and left upstanding frame portions has a recessed portion that allows the accelerator operation amount detecting unit to be visible from a forward direction.

15. The accelerator operator of the saddle riding vehicle according to claim 14, wherein the cover plate is disposed in an inclined position and is disposed more downwardly toward an outside in a vehicle width direction.

16. The accelerator operator of the saddle riding vehicle according to claim 14, wherein the accelerator operation amount detecting unit is offset on a first side in a crosswise direction relative to the head pipe in a front view.

17. The accelerator operator of the saddle riding vehicle according to claim 16, wherein:
the accelerator operation amount detecting unit and the accelerator operator are offset on a first side in the crosswise direction relative to the head pipe in a front view; and
the accelerator cable extending from the accelerator operator to a second side of the head pipe is routed to be curved around the head pipe and connected to the accelerator operation amount detecting unit.

18. An accelerator operator of a saddle riding vehicle, comprising:

an accelerator cable having a first end portion connected to the accelerator operator for displacement accordingly as the accelerator operator is operated;

an accelerator operation amount detecting unit connected to a second end portion of the accelerator cable for detecting an operation amount of the accelerator operator;

said accelerator operation amount detecting unit including:
  a rotatable member connected to the second end portion of the accelerator cable for rotation according to displacement of the accelerator cable, and
  a cover plate extending in a direction of a rotation axis of the rotatable member to cover the rotatable member from an upward direction,
  wherein the accelerator operation amount detecting unit is offset on a first side in a crosswise direction relative to a head pipe in a front view;

a front stay having a pair of left and right upstanding frame portions disposed forwardly of the head pipe and extending vertically along the head pipe; and a front cover for covering the head pipe from a forward direction;

wherein:
  the front stay is fixed to the head pipe so as to support the front cover; and
  one of the pair of right and left upstanding frame portions offset on a side of accelerator operation amount detecting unit in the crosswise direction relative to the head pipe has a recessed portion that allows at least the rotatable member of the accelerator operation amount detecting unit to be visible from the forward direction.

19. The accelerator operator of the saddle riding vehicle according to claim 18, wherein the accelerator operation amount detecting unit is disposed between outer edges of the pair of right and left upstanding frame portions in a front view.

20. The accelerator operator of the saddle riding vehicle according to claim 18, wherein:
  the front stay is supported on the head pipe via a pair of supporting tubes that are fixedly attached to the head pipe at two places vertically spaced apart from each other and extend forwardly; and
  the accelerator operation amount detecting unit is disposed between the pair of supporting tubes in a side view.

* * * * *